United States Patent [19]

Stroobach

[11] Patent Number: 5,119,322
[45] Date of Patent: Jun. 2, 1992

[54] DIGITAL DTMF TONE DETECTOR

[75] Inventor: Jerry Stroobach, Kanata, Canada

[73] Assignee: Mitel Corporation, Ontario, Canada

[21] Appl. No.: 346,750

[22] Filed: May 3, 1989

[30] Foreign Application Priority Data

May 5, 1988 [CA] Canada .................................. 566003

[51] Int. Cl.$^5$ .......................... G06F 15/31; G06F 7/34
[52] U.S. Cl. ................................ 364/724.09; 364/726
[58] Field of Search ...................... 364/724.01, 724.08, 364/724.09, 726, 721; 370/110.3

[56] References Cited

U.S. PATENT DOCUMENTS

| 4,223,185 | 9/1980 | Picou | 364/726 |
| 4,328,398 | 5/1982 | Kawaguchi et al. | 364/724.08 |
| 4,484,035 | 11/1984 | Graham et al. | 364/724.08 |
| 4,709,344 | 11/1987 | Crawford | 364/724.09 |

Primary Examiner—Long T. Nguyen
Attorney, Agent, or Firm—Antonelli, Terry, Stout & Kraus

[57] ABSTRACT

A digital dual tone multi-frequency (DTMF) tone receiver having a detector circuit for scanning incoming audio signals for possible presence of DTMF tones, and a verifier circuit for verifying the presence of the detected DTMF tones. The detector circuit performs successive discrete Fourier transforms on the incoming signal at a first level of accuracy, and in response generates a tone verify flag signal for indicating whether or not a DTMF tone has been detected. The verifier circuit is enabled in the event that the tone verify flag signal indicates detection of a DTMF tone. The verifier circuit then performs further discrete Fourier transforms on the incoming signal at the detected DTMF frequencies as well as frequencies adjacent thereto, at a second level of accuracy greater than that provided by the detection circuit. The verifier circuit generates a tone present flag signal for indicating whether or not the detected DTMF tone is actually present. The detector and verifier circuits are preferably implemented algorithmically within a digital signal processor.

7 Claims, 1 Drawing Sheet

DIGITAL DTMF TONE DETECTOR

FIELD OF THE INVENTION

This invention relates in general to tone receivers, and more particularly to a digital DTMF tone receiver for use in a communication system such as a PABX.

BACKGROUND OF THE INVENTION

Dual tone multi-frequency (DTMF) signals normally consist of two simultaneous tones for designating a dialed digit, one from a group of high frequency tones, and the other from a group of low frequency tones. The four DTMF tones whose nominal frequencies are 697, 770, 852 and 941 Hertz comprise the low group tones, while the four DTMF tones whose nominal frequencies are 1209, 1336, 1477 and 1633 Hertz comprise the high group tones.

Prior art analog tone receivers are well known for decoding DTMF tones in pairs. Such prior art analog receivers are typically of complex and expensive design, and have been found to yield inaccurate results. Furthermore, as a result of the trend towards digitization of PABXs and telephone central offices, many prior art analog tone receivers are quickly becoming obsolete.

In an effort to overcome the disadvantages of prior art analog tone receivers, and in keeping with the aforementioned trend towards digitization, a number of digital tone receiver circuits have been developed.

One such circuit is described in U.K. patent GB 2,049,360 (Ikeda), wherein an input signal sample is convolved with sampled values of reference signals having predetermined frequencies corresponding to the frequencies to be detected. The convolution is in the form of a discrete Fourier transform (DFT) which yields two series of trigonometric product values from which the spectrum components of the input signal can be determined at the desired frequencies.

A further prior art digital tone receiver is described in an article entitled "Add DTMF Generation and Decoding to DSP- μP Designs", by patrick Mock, published by Electronic Design News, Mar. 21, 1985. According to this latter prior art digital tone receiver, a discrete Fourier transform (DFT) is implemented according to what is known in the art as Goertzel's algorithm. The main advantage of using Goertzel's algorithm over the DFT approach used in the aforementioned U.K. patent, is that only one real coefficient is required to be generated per detection frequency in order to determine the magnitude of the signal component at the detection frequency.

Both prior art DFT based digital tone receivers suffer from the disadvantage that in order to obtain a sufficiently accurate measurement of the incoming signal frequency, a very lengthy and complex DFT is required to be calculated, resulting in very slow detection speed. Conversely, in the event that a fast and simple DFT is implemented, the detected tone cannot typically be ascertained with a sufficient degree of accuracy to comply with national and industry standard specifications for DTMF tone detection.

One approach to overcoming this two-fold prior art disadvantage, has been to execute two successive fast DFT detection algorithms on an incoming signal, at a low level of accuracy. If the results of both DFT detection algorithms indicate that a DTMF tone has been detected, then the tone is indicated as being present. This approach has been found in general to be deficient since the level of tone detection talk-off (simulation of DTMF tones by speech), or other causes of erroneous tone detection.

SUMMARY OF THE INVENTION

According to the present invention, a DFT based DTMF tone receiver is provided wherein a first quick DFT is performed on an incoming signal at each of the eight DTMF frequencies, at a relatively low level of accuracy. The DFT is performed quickly in order that a preliminary indication is provided as to whether or not the incoming signal contains a pair of tones which could be DTMF tones. If so, the incoming signal is then subjected to a verification algorithm in which a further DFT is performed at the two frequencies of the pair of tones detected by the first DFT, but at a much greater level of accuracy.

In effect, the first DFT (referred to herein as the tone detector), functions as a digital filter, for filtering out all tones (e.g. dial tone, speech, etc.) except possible DTMF tone candidates which are then processed by the second high accuracy DFT (referred to herein as the tone verifier).

Thus, the tone receiver according to the present invention operates quickly (i.e. does not require excessive amounts of computation time to implement), and is also highly accurate as a result of the aforementioned DFT tone verification algorithm.

According to a preferred embodiment, the DTMF tone receiver of the present invention may be implemented within a single chip digital signal processor (DSP) incorporated within the main controller of a PABX.

According to the present invention there is provided, in a communication system, a tone receiver comprised of circuitry for receiving an audio signal, a first circuit for detecting to a first level of accuracy, energy levels of the received audio signal at a plurality of frequencies, and generating a tone verify signal for indicating presence of one or more tones characterized by predetermined ones of the frequencies at which the energy levels exceed one or more predetermined thresholds, and a second circuit, in response to the tone verifying signal, for detecting to a second level of accuracy greater than the first level of accuracy, the energy levels of the received audio signal at the predetermined ones of the frequencies, and in response generating a tone present signal for verifying the presence of the one or more tones.

BRIEF DESCRIPTION OF THE DRAWINGS

A better understanding of the invention v 07 will be obtained with reference to the detailed description below in conjunction with the following drawings, in which.

DETAILED DESCRIPTION OF THE PREFERRED EMBODIMENT

Figure 1:
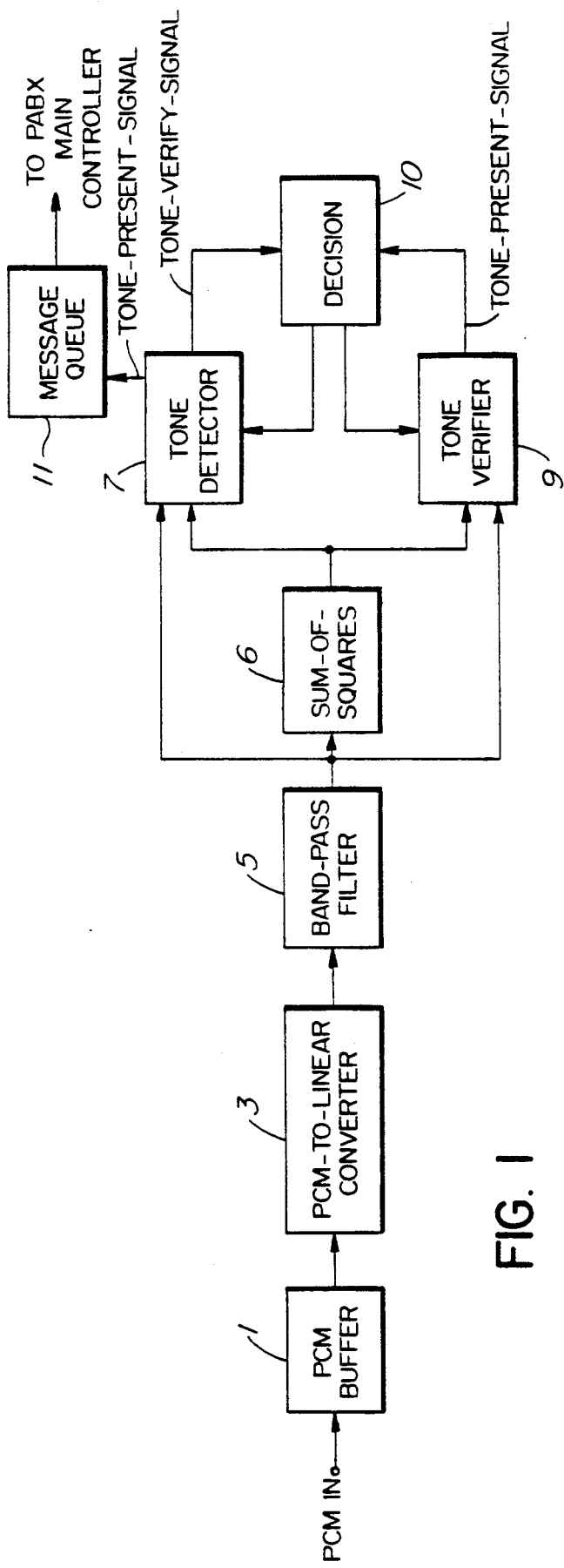
FIG. 1 is a block diagram illustrating a DTMF tone receiver in accordance with the present invention in its most general form.

With reference to FIG. 1, the tone receiver according to the present invention is shown comprised of a pulse code modulation (PCM) buffer 1 connected to a PCMto-linear converter 3 which in turn is connected to a band-pass filter 5. The output of band-pass filter 5 is connected to the inputs of a sum-of-squares detection circuit 6, a tone detector 7 and a tone verifier 9.

In operation, incoming PCM signals are divided into 8 millisecond blocks and stored within the PCM buffer 1. The stored PCM signals are then converted from μ-law or A-law compressed format to linear sample values within PCM to linear converter 3. The converted signals are output from converter 3 to the band-pass filter 5.

In a successful prototype of the present invention, band-pass filter 5 functioned as a dial tone rejection filter and was implemented in the form of a fifth order band-pass IIR (infinite impulse response) digital filter. The stop-band range was from 0 to 480 Hertz and 3400 to 4000 Hertz while the pass-band range was from 684.5 to 1659.5 Hertz, for providing a substantial attenuation of dial tone signals which otherwise could result in a failure to detect valid DTMF signals.

Sum-of-squares circuit 6 calculates the total block energy for the received incoming PCM signal and generates a digital signal representative thereof, for application to the tone detector 7 and tone verifier 9.

Tone detector 7 performs a fast DFT on the incoming signal and in response generates a tone verify signal for indicating whether or not the incoming signal contains a possible DTMF tone.

A decision circuit 10 receives the tone verify signal and in response either enables the tone verifier 9, or re-enables tone detector 7. Tone verifier 9 then performs a high accuracy DFT on the incoming signal in the event the tone verify signal indicates detection of a possible DTMF tone. The high accuracy DFT thus verifies the presence of the detected tone. Tone verifier 9 generates a tone present signal indicating whether or not the detected tone is actually present.

The tone present signal is transmitted to the decision circuit 10 and therefrom to the tone detector 7. Tone detector 7 then retransmits the tone present signal to a message queue 11. In the event that the tone present signal is at a logic high level, the detector 7 searches for the end of the tone. When the detector has determined that the tone has been removed a message is placed in the message queue 11, for transmission to a PABX main controller for indicating the particular DTMF tone detected. If the tone present signal is at a logic low level, tone detector 7 is enabled via decision circuit 10 for detecting possible DTMF tones in the following incoming PCM signal time slots.

Tone detector 7 searches for the low and high group DTMF tones with the highest energy levels by means of calculating the energy of the PCM signal at each of the aforementioned low and high group DTMF tone frequencies using a single point DFT.

Figure 2:
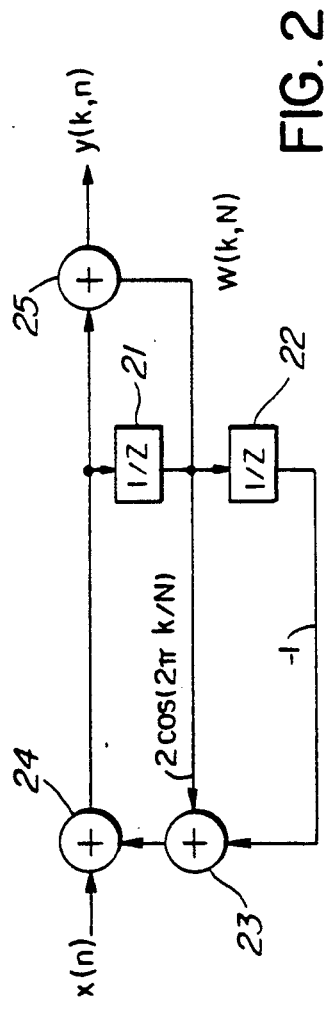
FIG. 2 is a directed graph representation of Goertzel's algorithm for implementing a DFT in accordance with a preferred embodiment of the present invention.

As discussed above, Goertzel's algorithm is used to implement the DFT in the form of a second order IIR filter, as illustrated in FIG. 2. The sequence of filtered linear incoming signals is received from band-pass filter 5 and applied to the tone detector 7, and is designated in FIG. 2 by the value x(n), having a sample length N, where N equalled 64 in the successful prototype.

The linear sampled values x(n) are applied to a unit sample delay register 21, and the delayed samples Output therefrom are multiplied by a scaling constant $2\cos(2\pi k/N)$, where k/N corresponds to the frequency to which the filter is tuned, divided by the sampling frequency (e.g. 8,000 Hertz).

The delayed sample is also applied to a further delay register 22, and the delayed output from register 22 is inverted and summed with the scaled sample output from register 21 via a summing circuit 23.

The output of summing circuit 23 is added to the linear input sample sequence x(n) via a further summing circuit 24, and the output thereof is applied to another additional summing circuit 25.

The delayed signal sample output from delay register 21 is multiplied by a further constant $-W(k,N)$, where $-W(k,N)$
$= \exp(-(j(2\pi k/N))$
$= \cos(2\pi k/N) - j\sin(2\pi k/N)$.

The output of summing circuit 25 (y(k,n)) is a complex digital value representative of the energy in the incoming signal at the detected frequency. More particularly, the unweighted energy measured by the DFT is given as follows:

$$Energy = y(k,N-1)^{**}2$$

Since y(k,n) only needs to be evaluated for n = N−1, the digital operations depicted in the right side of the filter diagram of FIG. 2 need only be evaluated once.

According to the successful prototype, tone detector 7 was implemented utilizing a Texas Instruments TMS32010 digital signal processor. The left side of the DFT illustrated in FIG. 2 required five DSP instructions per sample.

The following table shows the branch gain values used by the tone receiver DFT of FIG. 2.

TABLE 1

| Nominal Freq (Hz) | k | 2 cos (2 π k/N) *4096 | REAL part of W (k, N) *4096 | IMAGINARY part of W (k, N) *4096 |
|---|---|---|---|---|
| 697 | 5.576 | 6995 | 3497 | 2132 |
| 770 | 6.160 | 6739 | 3370 | 2329 |
| 852 | 6.816 | 6425 | 3213 | 2541 |
| 941 | 7.528 | 6055 | 3027 | 2759 |
| 1209 | 9.672 | 4768 | 2384 | 3331 |
| 1336 | 10.688 | 4081 | 2041 | 3552 |
| 1477 | 11.816 | 3271 | 1636 | 3755 |
| 1633 | 13.064 | 2329 | 1164 | 3927 |

The value 4096 in Table 1 represents a filter multiplier value of 1.

The apparent signal to signal-plus-noise ratio (designated as ASSPNR) is defined as the ratio of the measured energy to the total signal power, as measured by sum-of-squares circuit 6. For example, if a DFT is performed on a pure digital sine wave whose frequency matches the tuned frequency of the tone detector 7, using Goertzel's algorithm, the unweighted ASSPNR will equal 1, (disregarding round off errors).

In general, a rectangularly windowed pure digital sine wave of frequency f, when measured by a DFT using Goertzel's algorithm tuned to a nominal frequency of $f_{nom}$, (again disregarding round off errors), will yield an unweighted ASSPNR given by:

$$\left[ \frac{\sin(\pi(f - f_{nom})N/8000)}{\pi(f - f_{nom})N/8000} \right]^{**}2$$

where 8000 represents the sampling frequency, and N represents the input signal block size, (e.g. N = 64 for the receiver).

System and regulatory specifications require that DTMF tones which are within +/−(1.5% +2 Hz) of the nominal frequency be accepted as valid. The ASSPNR varies as a function of the absolute frequency deviation from the nominal frequency. Hence, high frequency tones are characterized by a lower ASSPNR at maximum deviation than low frequency tones. This is corrected according to the present invention by weighting the calculated energy value output from the DFT illustrated in FIG. 2, by a value that will result in a weighted ASSPNR of 0.8 at the maximum frequency deviation. The weighting factors used to implement this correction are represented below in Table 2, and were determined empirically to account for round off error and non-integer k values.

TABLE 2

| Nominal Freq. | Weighting Factor | Weighting Factor (in TMS32010 code) |
| --- | --- | --- |
| 697 | .8411 | 27560 |
| 770 | .8540 | 27984 |
| 852 | .8625 | 28262 |
| 941 | .8518 | 27912 |
| 1209 | .8918 | 29223 |
| 1336 | .9075 | 29726 |
| 1477 | .9273 | 30386 |
| 1633 | .9440 | 30933 |

The weighted energy is utilized to determine which tone has the highest level. The weighted energy is also used for twist, reverse twist, and signal-to-noise ratio tests where twist is defined as the ratio of high group DTMF tone energy to low group tone energy.

As discussed above, tone detector 7 is preferably implemented within a digital signal processor. The pseudo-code routine executed by the tone detector 7 according to the preferred embodiment, is as follows:

```
BEGIN [Detector]
    Tone_detected_flag := true
    Get low group tone with most energy by performing
        DFT using Goertzel's algorithm
    Get high group tone with most energy by performing
        DFT using Goertzel's algorithm
    IF low_group_tone_energy < detect_level_threshold
        THEN Tone_detected_flag := false
    IF high_group_tone_energy < detect_level_threshold
        THEN Tone_detected_flag := false
    IF (high_group_tone_energy / low_group_tone_energy) >
        max_twist_ratio THEN
        Tone_detected_flag := false
    IF (high_group_tone_energy / low_group_tone_energy) <
        min_twist_ratio THEN
        Tone_detected_flag := false
    IF ((high_group_tone_energy + low_group_tone_energy)/
        total_block_energy) < min_detector_ASSPNR THEN
        Tone_detected_flag := false
    IF tone_is_present_flag THEN
     BEGIN
        IF tone_detected_flag and (detected_tone =
            verify_tone) THEN
            Tone_absent_count := max_tone_absent_count
        ELSE
            Tone_absent_count := tone_absent_count - 1
        IF tone_absent_count = 0 THEN
         BEGIN
            Tone_present_flag := false
            Tone_absent_count := max_tone_absent_count
            Add message to queue indicating 'verify_tone' has
                been detected and verified
         END
     END
    IF (not tone_present_flag) and tone_detected_flag
        THEN
        BEGIN
```

-continued

```
            tone_verify_flag := true
            verify_tone := detected_tone
            number_of_verify_blocks_left := max_number_of_
                verify_blocks_left
            initialize registers for verifier
        END
END
```

The tone detector 7 indicates that a DTMF tone is valid only if the weighted energy level of each of the single detected tones exceeds the energy threshold, which according to the preferred embodiment is −32.5 dBm. Also, the measured twist must be between the min-twist-ratio and the max-twist-ratio thresholds which, according to the preferred embodiment are −15 dB and 13.5 dB, respectively.

Furthermore, the weighted ASSPNR must be greater than the min-detector-ASSPNR threshold, which according to the preferred embodiment is 0.66.

As discussed above with reference to FIG. 1, and the pseudo-code listing for the detector algorithm, tone detector 7 generates a tone verify signal (designated tone-verify-flag) in the event of detecting a pair of possible DTMF tones. The tone verify signal is applied to decision circuit 10 which in response enables the tone verifier 9.

Decision circuit 10 is preferably implemented as a portion of code within the DSP for controlling PCM buffer 1, PCM-to-linear converter 3, band-pass filter 5, and sum-of-squares circuits 6.

In particular, the pseudo-code for implementing decision circuit 10 is executed every 8 milliseconds, as follows:

```
BEGIN
    Wait until the 8 msec PCM buffer is full
    Convert PCM from μ-law (or A-law) to linear sample
        values
    Band pass filter for dial tone rejection
    Get sum-of-squares energy of filtered signal
    IF tone_verify_flag THEN
        Attempt to verify tone - do detailed analysis on two
            DTMF frequencies [call tone verifier] ELSE
        Attempt to detect tone - scan all 8 DTMF frequencies
            [call tone Detector]
END
```

The function of the tone verifier circuit 9 is to accept all valid tones and to reject as many non-valid tones as possible. The verifier 9 analyzes three contiguous 8 millisecond blocks of incoming signal responsive to tone detector 7 generating a logic high level tone verify signal. Intermediate results are saved between successive calls to the verifier. On every call to the verifier (i.e. the verifier being enabled by decision circuit 10), the following pseudo code routine is executed:

```
BEGIN (Tone Verifier)
    Add sum-of-squares block energy to verifier energy
        register
    Call fast version of detector to determine if tone
        still present
    IF tone is still present THEN
    BEGIN
        number_of_verify_blocks left := number_of_verify_
            blocks_left - 1
        do partial DFT using Goertzel's algorithm for low
            and high group verify tones
        IF number_of_verify_blocks_left = 0 THEN
        BEGIN
```

```
Tone_is_present_flag := true
Calculate energy for low and high group tones
    by performing DFT using Goertzel's algorithm
IF low_tone_energy < verify_level_threshold THEN
    Tone_is_present_flag := false
IF high_tone_energy < verify_level_threshold THEN
    Tone_is_present_flag := false
IF (high_tone_energy / low_tone_energy) > max_
    verify_twist THEN
    Tone_is_present_flag := false
IF (high_tone_energy / low_tone_energy) < min_
    verify_twist THEN
    Tone_is_present_flag := false
IF (pre_filter_signal_energy / post_filter_
    signal_energy) > dial_tone_present_threshold
    THEN
    min_verify_ASSPNR := dial_tone_present_min_
        verify_ASSPNR
    ELSE
    min_verify_ASSPNR := dial_tone_absent_min_
        verify ASSPNR
IF (low_tone_energy + high_tone_energy) / total_
    verify_energy < min_verify_ASSPNR THEN
    Tone_is_present_flag := false
IF low_tone_energy / (total_verify_energy - high_
    tone_energy) < min_low_group_SNR THEN
    Tone_is_present_flag := false
IF high_tone_energy / (total_verify_energy - low_
    tone_energy) < min_high_group_SNR THEN
    Tone_is_present_flag = false
END
END
```

In the third statement of the tone verifier Pseudocode, a fast version of the tone detector is called, in order to determine whether tone is still present. The fast detector is similar to the regular tone detector except that fewer single frequency tones are analyzed and the flags are managed differently. The primary purpose of the fast detector is to determine if the tone being verified is still present. If the fast detector indicates that no tone is present, verification is ended and the next call to the decision circuit 10 results in a subsequent call to the tone detector 7.

The detector 7 will sometimes detect an incorrect low group tone. This can occur due to the low group tone frequencies being close together in frequency and because of a relatively large non-linear group delay of the dial tone rejection filter. This error generally occurs if the tone is received just after the tone detector 7 is enabled, or if the tone starts just before the detector block 7 is enabled and the dial tone filter has not had a chance to settle. To compensate for this problem, the two low group tones adjacent to the detected low group tone are also analyzed on the first call or implementation of the fast detector and the tone verifier 9. This gives the detector the opportunity to correct the tone being verified.

The following table shows which low group tones are analyzed by the fast detector on the first call from verifier 9.

TABLE 3

| Detected tone | Tones analyzed by the fast detector |
|---|---|
| 697 | 697, 941, 770 |
| 770 | 770, 697, 852 |
| 852 | 852, 770, 941 |
| 941 | 941, 852, 697 |

On each call to the fast detector from tone verifier 9, the following pseudo-code routine is executed:

```
BEGIN (fast detector)
    Get high group verify tone energy
    Get low group verify tone energy
    IF number_of_verify_blocks_left = max_number_of_
        verify_blocks_left THEN
        BEGIN
            Get energy of tones adjacent to the low group
                verify tone by performing a DFT using Goertzel's
                algorithm
            Get low group tone with highest energy by
                performing a DFT using Goertzel's algorithm
            Verify_tone := detected_tone
        END
    Tone_detected_flag := true
    IF low_group_tone_energy < detect_level_threshold THEN
        Tone_detected_flag := false
    IF high_group_tone_energy < detect_level_threshold
        THEN
        Tone_detected_flag := false
    IF (high_group_tone_energy / low_group_tone_energy) >
        max_twist_ratio THEN
        Tone_detected_flag := false
    IF (high_group_tone_energy / low_group_tone_energy) <
        min_twist_ratio THEN
        Tone_detected_flag := false
    IF ((high_group_tone_energy + low_group_tone_energy) /
        total_block_energy) < min_detector_ASSPNR THEN
        Tone_detected_flag := false
    IF not tone_detected_flag THEN
        verify_tone_flag := false
END
```

Tone verifier 9 is also implemented utilizing the Goertzel algorithm, as discussed above with reference to tone detector 7. The verifier 9 preferably uses a verification block size of N = 3 * 64 = 192 samples, according to the successful prototype. This block size yields a finer frequency resolution (i.e. higher accuracy) than is achieved by the detector 7.

As discussed above, the performance specification requires that any tone frequency within +/−(1.5% + 2 Hz) of nominal frequency be accepted as a valid tone. If the worst case ASSPNR is not constant for any pure tone in the valid accept frequency range, then the twist, level and ASSPNR thresholds must be adjusted to compensate for this variation.

For example, the theoretical unweighted ASSPNR for a tone deviating 1.5% from the nominal frequency of 697 Hz and measured using a single Goertzel DFT, would be:

$$\left[ \frac{\sin(\pi(697 - 686.5)192/8000)}{(\pi(697 - 686.5)192/8000)} \right]^{**}2 = 0.8093$$

A tone deviating 1.5% from the nominal frequency of 1209 Hz, measured with an unweighted Goertzel DFT would have an ASSPNR of 0.5130.

Therefore, in order to successfully verify the 697/1209 Hz DTMF tone with a per-frequency deviation of 1.5%, would require a value for min_verify_ASSPNR of less than (0.8093 + 0.5130) / 2 = 0.661. This means that signals with a measured noise content of 33.9% will be accepted. According to the preferred embodiment, the value for min_verify_ASSPNR is 0.935, meaning any signal with a measured noise content of greater the 6.5% is rejected.

The measured ASSPNR of any noiseless DTMF tone is approximately equal to 1.0 if both tone frequencies are within +/−(1.5% + 2 Hz) of nominal frequency. The measured energy drops rapidly if either frequency goes outside of that range. The value of the measured energy must be low enough that there are no false readings for tones deviating more than 3.5% from nominal.

The above objectives are achieved in the verifier circuit 9 by measuring the energy at predetermined DTMF frequencies using multiple Goertzel filters. Each filter is tuned to a slightly different frequency. The energy measured by each tuned Goertzel filter is weighted and summed. This weighted sum is the measured energy at a specific DTMF frequency. Two Goertzel filters are used to measure the energy of each low group tone and three Goertzel filters are used to measure the energy of each high group tone.

The following table, Table 4, shows the frequency and weight of each Goertzel filter used by the verifier circuit 9.

TABLE 4

| Nominal Freq. (Hz) | k | Tuned Filter Freq. (Hz) | Weight |
|---|---|---|---|
| 697 | 16.340 | 680.8 | 0.8745 |
|  | 17.116 | 713.2 | 0.8745 |
| 770 | 18.068 | 752.8 | 0.9192 |
|  | 18.892 | 787.2 | 0.9192 |
| 852 | 20.019 | 834.1 | 0.9598 |
|  | 20.877 | 869.9 | 0.9598 |
| 941 | 22.152 | 923.0 | 0.9671 |
|  | 23.016 | 959.0 | 0.9671 |
| 1209 | 28.261 | 1177.5 | 0.7736 |
|  | 29.016 | 1209.0 | 0.8668 |
|  | 29.771 | 1240.5 | 0.7736 |
| 1336 | 31.269 | 1302.9 | 0.8185 |
|  | 32.064 | 1336.0 | 0.9072 |
|  | 32.859 | 1369.1 | 0.8185 |
| 1477 | 34.608 | 1442.0 | 0.8734 |
|  | 35.448 | 1477.0 | 0.9434 |
|  | 36.288 | 1512.0 | 0.8734 |
| 1633 | 38.347 | 1597.8 | 0.8828 |
|  | 39.192 | 1633.0 | 0.9469 |
|  | 40.037 | 1668.1 | 0.8828 |

For all single frequency DTMF tones, except for 697 and 770 Hz, a single pure tone, within $+/-(1.5\% + 2$ Hz) of nominal frequency will yield a measured ASSPNR between 1.0 and 1.019, assuming no computational round off errors. This variation is a function of both the frequency and phase of the measured signal. A variation of 1.4% is due to frequency variation and 0.5% is due to phase variation. The measured ASSPNR for a pure tone within $+/-1.5\%$ of 697 or 770 Hz is between 1.0 and 1.041. The measured ASSPNR for a tone within $+/-(1.5\% + 2$ Hz) of 697 or 770 Hz is between 0.981 and 1.041. The wider range of the measured ASSPNR for the 697 and 770 Hz tones is required to guarantee rejection of tones deviating more than 3.5% from nominal frequency.

Tone verifier 9 will accept a DTMF tone only if the measured energy level of each of the single tones detected exceeds the verify level threshold, which according to this successful prototype was set at −32 dBm. Similarly, a DTMF tone will only be accepted if the measured twist is between the min-verify-threshold (e.g. −11.5 dB) and the max-verify-twist threshold (e.g. 10.5 dB).

As discussed above, once a tone has been verified via the tone verifier 9, tone detector 7 generates a message signal for application to message queue 11 and therefrom to the PABX main controller (not shown). In particular, according to the successful prototype, once every millisecond the message queue 11 is polled to determine whether or not a message signal is to be transmitted. If so, the message signal is written onto a data bus or message communication channel of the PABX and the main controller is interrupted to read the message signal.

The message signal conforms to the following format: OXXXYYYY, where the three-bit field XXX indicates the PCM channel in which the DTMF tone was detected, and the four-bit field YYYY designates the particular one of the 16 DTMF tones detected.

A person understanding the present invention may conceive of other embodiments thereof.

For example, while the preferred embodiment is directed to DTMF tone detection, it is contemplated that other types of tones (e.g. MF-R1, MF-R2, etc.) may be detected using the principles of the present invention, suitable modifications being made to the threshold values, etc.

Furthermore, the order in which the algorithmic pseudo-code steps are performed may be altered in various ways without affecting the substance of the invention.

All such variations or embodiments are believed to be within the sphere and scope of the invention as defined by the claims appended hereto.

I claim:

1. A tone receiver comprised of:
   (a) means for receiving a pulse code modulated (PCM) audio signal;
   (b) first means for detecting to a first level of accuracy, energy levels of said received audio signal at a plurality of frequencies and generating a tone verify signal for indicating presence of one or more tones characterized by predetermined ones of said frequencies at which said energy levels exceed one or more predetermined thresholds; and
   (c) second means connected to receive said audio signal, and in response to the tone verifying signal, for detecting to a second level of accuracy which is greater than said first level of accuracy, said energy levels of the received audio signal at only said predetermined ones of said frequencies and generating a tone present output signal verifying the presence of said one or more tones,
   said means for receiving said audio signal being comprised of:
   (i) a PCM buffer for receiving and storing successive blocks of said PCM signal,
   (ii) means for converting said PCM signal to a linear sampled signal,
   (iii) digital means for band pass filtering said linear sampled signal in order to attenuate dial tone frequencies of said audio signal,
   (iv) further digital means for receiving the filtered linear sampled signal and in response generating a sum-of-squares energy signal, and
   (v) means for transmitting said sum of squares energy signal to said first means and said second means.

2. A tone receiver defined in claim 1, wherein said first and second means perform discrete Fourier transforms on said received audio signal in order to measure said energy levels to said first and second levels of accuracy, respectively.

3. A tone receiver as defined in claim 2, including a second order infinite impulse response filter in each of said first and second means for processing said discrete Fourier transforms according to Goertzel's algorithm.

4. A tone receiver as defined in claim 1, 2 or 3, wherein said plurality of frequencies are dual tone multi-frequency (DTMF) frequencies.

5. A tone receiver as defined in claim 1, 2 or 3, further including fast detector means responsive to said tone verify signal, for measuring said energy levels of the received audio signal at frequencies adjacent said predetermined ones of said frequencies and in response generating a control signal to said second means indicative of whether or not said predetermined one or more tones are currently present.

6. A tone receiver as defined in claim 1, 2 or 3 wherein said first means is further comprised of means for receiving said energy signal and for detecting to said first level of accuracy, maximum and minimum twist ratios and apparent signal to signal plus noise ratios of said energy signal, and in response generating said tone verify signal.

7. A tone receiver as defined in claim 1, 2 or 3 wherein said second means is further comprised of means for receiving said energy signal and for detecting to said second level of accuracy, maximum and minimum twist ratios and apparent signal to signal plus noise ratios of said energy signal, and in response generating said tone present output signal.

* * * * *